Patented Aug. 26, 1930

1,774,443

UNITED STATES PATENT OFFICE

KARL KRAUER AND GUSTAV HESS, OF BASEL, SWITZERLAND, ASSIGNORS TO THE FIRM SOCIETY OF CHEMICAL INDUSTRY IN BASLE, OF BASEL, SWITZERLAND

VAT DYESTUFFS OF THE ANTHRAQUINONE SERIES

No Drawing. Application filed October 10, 1927, Serial No. 225,389, and in Switzerland October 20, 1926.

The present invention refers to new vat dyestuffs of the anthraquinone series. It comprises the new vat dyestuffs, their method of manufacture, and the material, which has been dyed with the new products.

The new dyestuffs are obtained as follows:—

In a first step the so-called diketoperylene dyestuffs of the general formula

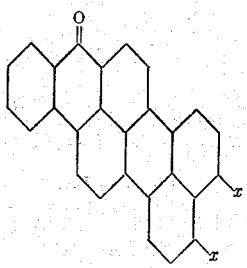

wherein the one of the two $x$'s stands for a benzoyl radical

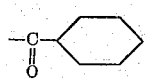

which is linked in ortho-position to its CO-group to the carbon atom which is linked to the other $x$, such as violanthrone or isoviolanthrone or the substitution products of these dyestuffs, are converted, by treatment with sulphonating agents, such as sulphuric acid monohydrate, chlorosulphonic acid or fuming sulphuric acid, into new sulphonic acids. These new sulphonic acids, the constitution of which has not as yet been ascertained, dissolve in water to violet to blue solutions and with hydrosulphite and alkali yield violet to blue vats which dye cotton violet to bluish and green tints.

In a second step the new sulphonic acids are treated with hot alkalies. They are thus changed into other new compounds, apparently hydroxy-compounds, which are dark powders yielding red-violet to blue alkaline vats which dye cotton blue to grey and olive tints, for the most part sensitive to chlorine and acids.

In a third step these hydroxy-compounds are treated with etherifying agents, such as alkyl- or aralkylhalides, acid esters, aldehydes, acetals, and the like. There are thus obtained new dyestuffs, which form dark powders which dissolve in concentrated sulphuric acid to blue solutions, yielding red-violet to blue vats which dye cotton grey to blue-green tints which have remarkable properties of fastness. Particularly valuable are the fastness to chlorine and to light of their bright tints on cotton. These dyestuffs may be converted by chlorination into halogenated dyestuffs of the same properties. Like products may be obtained by halogenating the products of the second step before the treatment with etherifying agents.

Example 1

10 parts of violanthrone of the formula

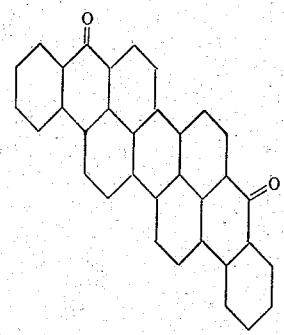

are dissolved in 100 parts of sulphuric acid monohydrate. To this solution are added 30 parts of fuming sulphuric acid of 24 per cent strength and the whole is heated for some hours at 125–130° C. After cooling, the mass is poured into ice-water, and the blue flocculent precipitate is filtered by suction and then dissolved in hot water. The solution is filtered, and after it has been made feebly alkaline the sodium salt of the new violanthrone sulphonic acid is salted out with common salt, filtered and washed with dilute common salt solution.

The new compound dissolves in water to a blue solution and in concentrated sulphuric acid to a violet solution. Its vat is violet-blue and dyes cotton blue tints.

Similar sulphonated dyestuffs may be produced from isoviolanthrone of the formula

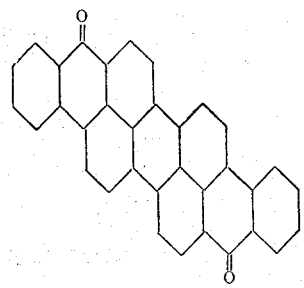

and dimethyl violanthrone.

Like products are also obtained when sulphuric acid monohydrate or chlorosulphonic acid is substituted for the fuming sulphuric acid.

The colour tint of the dyestuff may be shifted by addition of some other material to the mixture undergoing sulphonation. For instance, in sulphonating violanthrone as described in the first paragraph of this example, the addition of boric acid determines the production of a redder dyeing dyestuff.

Example 2

10 parts of violanthrone are dissolved in 100 parts of fuming sulphuric acid of 24 per cent strength. This solution is heated to 130° C. and stirred for 2 hours at 130 to 135° C. After cooling the sulphonation liquid is poured into ice water, dissolving the precipitate and salting out the sodium salt of the sulphonic acid thus produced with common salt. The red-violet precipitate is then filtered and washed free of acid with a solution of common salt.

The product dissolves in sulphuric acid to a violet blue solution and in water and dilute caustic soda solution to a red-violet solution. If this alkaline solution is boiled for a long time a shift of color of the solution occurs toward green. From a blue vat cotton is dyed greenish-blue. The compound treated with hot alkali dyes from a blue vat green tints which are sensitive to acids. In sulphuric acid the product treated with caustic soda solution dissolves to a red-violet solution.

Example 3

Into 100 parts of fused caustic potash are introduced at 180° C. 10 parts of the violanthrone sulphonic acid of Example 1. The brown black melt is heated to 270° C. and stirred at this temperature for 1 hour; it is then dissolved in water, the solution boiled for some time and the precipitate thus produced is filtered by suction and washed. The dyestuff thus obtained is a grey-black powder which dissolves in concentrated sulphuric acid to a blue solution and yields a red-violet vat which dyes cotton blue-grey tints, which are sensitive to chlorine and acids.

Similar products are obtained if the other sulphonic acids mentioned in the Example 1 are treated with alkalies. By fusing the sulphonic acid with alcoholates, or with alkali in presence of alcohol, (cf. Example 4), a dyestuff is obtained that dyes cotton a violet tint.

The fusion with alkali may also be conducted in presence of a diluent such as aniline.

Example 4

120 parts of caustic potash are introduced into 60 parts of alcohol. After heating to 160° C. 20 parts of the green sodium salt obtained as described in Example 2 are added to the mixture, while stirring. The melt is then heated within one hour, while simultaneously distilling off the alcohol, to 230° C. and the temperature is kept at 230 to 240° C. for a further ½ hour. The melt is then poured out, dissolved in water, the dyestuff oxidized out while boiling, separated by suction and washed.

The product dissolves in sulphuric acid to a violet solution, from which on addition of water olive-green flocks separate. From a blue vat cotton is dyed olive tints which are sensitive to chlorine and acids.

Example 5

10 parts of the dyestuff obtained as described in Example 3 first paragraph, 15 parts of calcined sodium carbonate and 15 parts of toluene sulphonic acid methylester are mixed with 300 parts of trichlorobenzene and the whole is heated to boiling for some hours. The blue solution is filtered and the residue washed with alcohol. When dry the residue is a grey black powder which dissolves in concentrated sulphuric acid to a blue solution. This dyestuff forms a red-violet vat which dyes cotton blue-grey tints of remarkable fastness, particularly fastness to chlorine.

A very pure product is obtained by methylating in nitrobenzene, in which case a part of the dyestuff crystallizes from the hot filtrate.

The methylation may occur in other solvents, for instance in a nitrohydrocarbon, like nitrobenzene. Instead of methylating the hydroxy-compound, it may be ethylated, for instance with toluene sulphonic acid ethylester or diethylsulphate, aralkylated or quite generally treated with any desired etherifying agent. Like products are obtained by etherifying the products, which are obtainable by treating the sulphonation product of dimethylviolanthrone or isoviolanthrone with caustic alkalies. The product obtained according to Example 4 yield at the etherification products which dye cotton from a blue vat fast blue-green tints.

Example 6

10 parts of the dyestuff made as described in the first paragraph of Example 5 are suspended in 30 parts of nitrobenzene and stirred for 3 hours at 80–90° C. with 10 parts of sulphuryl chloride. The dyestuff dissolves in part to a blue grey solution. The mixture is distilled with steam, the residue filtered, washed and dried.

This product dissolves in concentrated sulphuric acid to a blue solution, from which on addition of water blue flocks separate. The dyestuff yields a blue vat which dyes cotton grey tints, having a more bluish hue than that of the dyeing of the dyestuff before it is halogenated.

What we claim is:—

1. As new products of manufacture the vat dyestuffs of the anthraquinone series obtainable by treating firstly violanthrone with oleum at temperatures above 100° C., secondly treating the new sulphonic acid thus obtained with alkalies and finally treating the new compound thus obtained with such alkylating agents which introduce alkyl residues containing not more than two carbon atoms, which products form dark powders, dissolving in concentrated sulphuric acid to blue solutions, yielding red-violet vats which dye cotton blue-grey tints of remarkable fastness.

2. As a new product of manufacture the vat dyestuff of the anthraquinone series obtainable by treating firstly violanthrone with oleum at temperatures above 100° C., secondly treating the new sulphonic acid thus obtained with alkalies, and finally treating the new compound thus obtained with methylating agents, which product forms a dark powder, dissolving in concentrated sulphuric acid to a blue solution, yielding a red-violet vat which dyes cotton a blue-grey tint of remarkable fastness.

3. Material dyed with the dyestuffs of claim 1.

4. Material dyed with the dyestuff of claim 2.

In witness whereof we have hereunto signed our names this 30th day of September, 1927.

KARL KRAUER.
GUSTAV HESS.